United States Patent [19]

Morgan

[11] Patent Number: 4,689,121
[45] Date of Patent: Aug. 25, 1987

[54] RECOVERY OF PHOSPHORUS FROM SLUDGE

[75] Inventor: George J. Morgan, Ossining, N.Y.

[73] Assignee: Stauffer Chemical Company, Westport, Conn.

[21] Appl. No.: 393,144

[22] Filed: Jun. 28, 1982

[51] Int. Cl.$^4$ .............................................. B01D 3/06
[52] U.S. Cl. ........................................ 203/14; 203/88; 203/98; 203/DIG. 25; 202/233; 159/2.1; 159/47.1; 210/906; 423/322; 423/323
[58] Field of Search ..................... 203/88, 100, 12, 14, 203/DIG. 25, 98; 423/322, 321 R, 299, 323; 202/234, 235, 233; 210/906; 159/2.1, 47.1

[56] References Cited

U.S. PATENT DOCUMENTS

| | | | |
|---|---|---|---|
| 2,976,224 | 3/1961 | Gilliland | 203/100 |
| 3,032,482 | 5/1962 | Shoemaker | 203/100 |
| 3,084,029 | 4/1963 | Barber et al. | 423/323 |
| 4,081,333 | 3/1978 | Holmes et al. | 423/322 |

OTHER PUBLICATIONS

Kirk-Othmer, *Encyclopedia of Chemical Technology*, Third Ed., 1979, 7, p. 860.
Murch, Robert M., *Thermally Stable Hydraulic Fluids*, Grace (W. R.) & Co., Clarksville, MD, Research Div. Corp., Source Codes: 400450, Report No. AFMC T-R-68-337, Jan. 69, p. 35.
Hackh's, *Chemical Dictionary*, 4th ed., McGraw, ed--Hill, p. 680, 1972.
Hengstebeck, "Distillation-Principles and Design Procedures", pp. 17-18, Reinhold Publishing Corp., New York, 1961.
Watson, "First International Symposium on Water Desalination", pp. 1-14, Wa., D.C., 1965.

Primary Examiner—S. Leon Bashore
Assistant Examiner—V. Manoharan
Attorney, Agent, or Firm—Vivienne T. White

[57] ABSTRACT

A process of recovering elemental phosphorus from sludge is disclosed wherein the sludge is flash evaporated utilizing a heat transfer means and then separated from the solid impurities contained therein.

4 Claims, 1 Drawing Figure

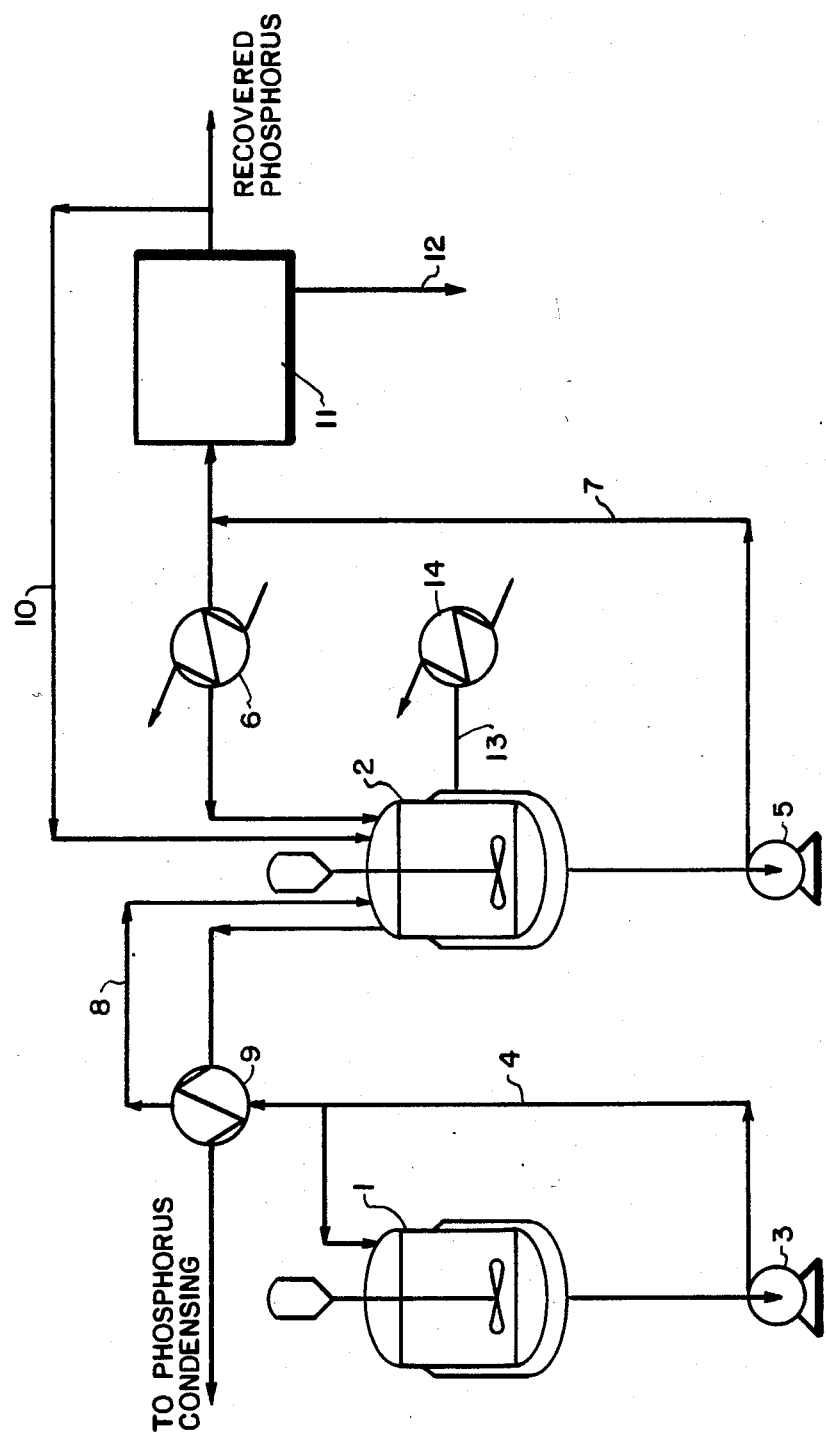

RECOVERY OF PHOSPHORUS FROM SLUDGE

BACKGROUND OF THE INVENTION

The present invention relates to an improved process for recovering elemental phosphorus from sludge, and more particularly from the sludge formed during the production of elemental phosphorus by the smelting of phosphate rock.

The basic method for producing elemental phosphorus is accomplished by the reduction of phosphate rock with coke or other carbonaceous reducing agents in the presence of silica. This is referred to as the furnace "charge" or "burden". The phosphorus production is generally carried out in an electric furnace at a reaction temperature of about 1,400° to about 1,500° C.

The mechanism of the reduction of phosphate rock to elemental phosphorus is quite complex and the exact path of the reaction sequence has not been conclusively defined. The overall reaction is generally represented by the following simplified equation:

$$2Ca_3(PO_4)_2 + 6SiO_2 + 10C \rightarrow 6CaSiO_3 + 10CO + P_4$$

During the course of the reaction, the phosphorus produced vaporizes, rises, and is cooled, condensed, and collected under water. The phosphorus vapor is generally accompanied by carbon monoxide and appreciable quantities of entrained dust comprising phosphate burden, fluorine, calcium oxides, potassium oxides and the like. The dust and vapor mixture can be passed through an electrostatic precipitator where most of the dust is removed prior to cooling the phosphorus vapor. The CO gas can be recovered for use as fuel or properly disposed of in accordance with pollution requirements. Solid furnace residue comprising calcium silicate is drawn off from the bottom of the furnace as a molten liquid. Iron phosphide or "ferrophosphorus" formed from the iron impurities present in the phosphate ore is also drawn off as a melt from the bottom of the furnace.

The condenser drains into a sump wherein the phosphorus product is collected. Three separate layers generally form in the condenser sump.

A layer of relatively high grade phosphorus is obtained at the bottom. The intermediate layer is a mixture referred to as "sludge", which consists of phosphorus droplets or globules, solid impurities, and water. Above the sludge layer is a water layer. The boundary between the sludge layer and water layer is not clearly defined.

The amount of phosphorus sludge ($P_4$-sludge) produced will vary, depending upon factors such as the initial composition of phosphate rock charged, the operating conditions and design of the furnace. Phosphorus sludge can contain from about 5% to about 90% by weight elemental phosphorus. The phosphorus content of the sludge produced can vary from about 10 to about 60 weight percent or more, of the furnace output of elemental phosphorus.

The elemental phosphorus can be recovered from the sludge by roasting. This operation is becoming more expensive due to rising energy costs. It is also hazardous due to pressures generated inside the roaster. In addition, roasting leads to high $P_2O_5$ emissions, a pollution problem. Other methods for treating the sludge include burning it and making low grade phosphoric acid.

The sludge, as the term is used in the art and herein, appears to be a poorly defined emulsion containing solid impurities, water and phosphorus in widely varying proportions and having a density between the density of phosphorus and the density of water. The sludge can have the characteristics of a "phosphorus in water" type emulsion, that is, the phosphorus being the discontinuous phase and the water being the continuous phase, or a "water in phosphorus" type emulsion, that is the water being the discontinuous phase and the phosphorus being the continuous phase. Microscopic examination of the phosphorus in water type sludge shows that the phosphorus is present in small globular particles which will not coalesce. The size of the particles are generally in the range of micron to millimeter, and larger dimensions.

Various methods for recovering elemental phosphorus from sludge have been suggested in the prior art. Among these are physical methods for separating the phosphorus, such as filtration, distillation, stirring and settling, vibration, centrifuging, extractions, electrolysis; and the like.

U.S. Pat. No. 3,104,952 to Hartig discloses a process of recovering elemental phosphorus from phosphorus sludge comprising admixing the sludge with phosphoric acid prior to or simultaneously with steam distillation. British Pat. No. 524,289 discloses eliminating the water in the sludge by heating the sludge in a closed vessel under pressure below atomspheric, or to a temperature closely below the boiling point of water at atomspheric pressure for breaking the emulsion and causing the phosphorus to assume the form of a mobile melt from which solid impurities can be separated by any desired manner, as for instance, by filtering.

The present invention achieves the recovery of phosphorus from sludge by flash evaporating the water from the sludge utilizing a heat transfer means which eliminates the sludge.

SUMMARY OF THE INVENTION

In accordance with the invention elemental phosphorus is recovered from phosphorus sludge by a process comprising the steps of (1) flash evaporating the water from the sludge and (2) separating and recovering the elemental phosphorus from solid impurities contained in the evaporated sludge.

BRIEF DESCRIPTION OF THE DRAWINGS

FIG. I is a schematic illustration of an embodiment of the process of the invention.

DETAILED DESCRIPTION OF THE INVENTION

In the practice of the invention water contained in the phosphorus sludge is flash evaporated causing the phosphorus to coalesce which thereby eliminates the sludge. As a result, the solid impurities in the phosphorus float to the surface resulting in the easy separation of the phosphorus from the solid impurities by well known techniques such as by centrifuging, filtering, settling or the like.

Heated phosphorus is utilized as a direct heat transfer fluid in the process for flash evaporating the water in the sludge. This process would eliminate the fouling and scaling problems associated with indirect heat transfer means such as heat exchangers, roasters and the like.

In the process, a sufficient amount of phosphorus is utilized with respect to the amount of sludge being treated to produce the preferred result of flash evaporating the water present and coalescing the phosphorus.

The solid impurities in the phosphorus which float to the surface when the sludge is eliminated generally comprised of phosphate, coke, hydrated and acidified alkalies from the furnace condensing operation.

The process can be operated over a wide temperature range. Although it is only necessary to utilize a temperature high enough to evaporate the water. The temperature of the phosphorus, at atmospheric pressures, should be from about 100° C. to about 110° C. and preferably from about 102° C. to about 105° C. In addition, flash evaporation can also be accomplished under vacuum or pressure at respectively lower or higher temperatures although pressures near atmospheric or higher are preferred.

An embodiment of the practice of the invention is exemplified in FIG. I wherein sludge is fed from a heated and stirred vessel 1 to a flash evaporator 2 by a metering system 3 via line 4. Molten phosphorus is fed via line 13 from heat exchanger 14 to the flash evaporator 2. Various types of flash evaporators can be utilized in the process. The flash evaporator 2 in the embodiment is a heated and stirred vessel having a pump-around system 5 used primarily to reduce the size of the flash evaporator and the volume of "in process" phosphorus being circulated therefrom. The system 5 circulates and heats the phosphorus sludge in an external heat exchanger 6 via line 7 at a temperature above 100° C. and generally at a temperature of from about 105° C. to about 120° C. The sludge which may be preheated to about 100° C. is fed to the top of the flash evaporator 2 via line 8. The vapor, mainly water, from the flash evaporator 2 is used to preheat the sludge feed to the evaporator utilizing heat exchanger 9. The condensate from heat exchanger 9 which is contaminated with phosphorus is returned to the phosphorus condensing area as makeup water.

Alternatively, phosphorus may be recycled via line 10 if the concentration of solid impurities is too high for pumping.

It should be obvious that other methods of practicing the invention are within the knowledge of those skilled in the art. For instance, jacketed flash evaporator similar to 2, containing additional heating coils (not shown) can be utilized without a pump around system as shown in FIG. I.

In the embodiment shown the phosphorus and solid impurities are removed from the pump around system 5 by known means such as centrifuging, filtration, settling, representing by 11 and the like. The recovered solids which contain a small amount of phosphorus can be recycled to the furnance, roasted or otherwise disposed of in an ecologically safe manner via line 12.

What is claimed is:

1. A process for recovering elemental phosphorus values from sludge comprising the steps of:
   (a) causing heated phosphorus from an external source to come into contact with sludge, the phosphorus used as a direct heat transfer medium being at a sufficient temperature to flash evaporate the water contained in the sludge; thereby coalescing the phosphorus values, and
   (b) separating and recovering the elemental phosphorus values from the sludge solids.

2. The process of claim 1 wherein the sludge is derived from the production of elemental phosphorus.

3. The process of claim 1 wherein the phosphorus values are separated and recovered by centrifugation.

4. The process of claim 1 wherein the phosphorus values are separated and recovered by means of filtration.

* * * * *